US010108731B2

(12) United States Patent
O'Connell, Jr. et al.

(10) Patent No.: US 10,108,731 B2
(45) Date of Patent: Oct. 23, 2018

(54) SYSTEM AND METHOD FOR TIMELINE MANAGEMENT OF OBJECTS

(75) Inventors: Conleth S. O'Connell, Jr., Austin, TX (US); Marceu Martins De Souza Filho, Toronto (CA); Lee Shepstone, Oxford (GB)

(73) Assignee: Open Text SA ULC, Halifax (CA)

(*) Notice: Subject to any disclaimer, the term of this patent is extended or adjusted under 35 U.S.C. 154(b) by 322 days.

(21) Appl. No.: 13/248,770

(22) Filed: Sep. 29, 2011

(65) Prior Publication Data

US 2014/0310623 A1 Oct. 16, 2014

Related U.S. Application Data

(60) Provisional application No. 61/387,779, filed on Sep. 29, 2010.

(51) Int. Cl.
*G06F 3/048* (2013.01)
*G06F 17/30* (2006.01)

(52) U.S. Cl.
CPC ................................ *G06F 17/3089* (2013.01)

(58) Field of Classification Search
None
See application file for complete search history.

(56) References Cited

U.S. PATENT DOCUMENTS 7,840,604 B2* 11/2010 Zhu et al. ..................... 707/802
7,925,676 B2* 4/2011 Hogue et al. ................. 707/803
8,077,918 B2* 12/2011 Kirmse et al. ................ 382/103
2005/0114356 A1* 5/2005 Bhatti ............... G06F 17/30115
2007/0130546 A1* 6/2007 Harris et al. .................. 715/854
2007/0282812 A1* 12/2007 Johnson ................. G06Q 10/10
2008/0189617 A1* 8/2008 Covell ................ G06F 17/3089 715/738
2008/0294663 A1* 11/2008 Heinley ................ G06F 3/0481
2008/0301095 A1* 12/2008 Zhu et al. ......................... 707/3
2008/0307454 A1* 12/2008 Ahanger ................ G06Q 30/02 725/36
2009/0006953 A1* 1/2009 Perantatos .......... G06F 17/3089 715/700
2009/0049108 A1* 2/2009 Forde et al. .................. 707/203
2009/0234945 A1* 9/2009 Chande et al. ............... 709/224
2009/0300705 A1* 12/2009 Dettinger ................ G06F 21/10 726/1
2010/0205159 A1* 8/2010 Li .......................... G06Q 10/06 707/694

(Continued)

*Primary Examiner* — Andrey Belousov
*Assistant Examiner* — Haimei Jiang
(74) *Attorney, Agent, or Firm* — Sprinkle IP Law Group

(57) ABSTRACT

At least one embodiment includes a system for managing objects. The system may be configured to provide a set of objects in a repository with associated metadata including workflow metadata and an application program interface. The system may determine a first region of interest in a graphical user interface, the first region of interest corresponding to a first time range. The system may retrieve metadata for a first set of objects having workflow metadata indicating at least one event will occur within the first time range, create a first set of nodes representing the first set objects, display the first set of nodes based on a time characteristic of the workflow metadata associated with the at least one event, and perform an action on a corresponding object from the first set of objects.

23 Claims, 7 Drawing Sheets

(56) References Cited

U.S. PATENT DOCUMENTS

| | | | | |
|---|---|---|---|---|
| 2010/0235202 | A1* | 9/2010 | Strelling | G06Q 10/06 705/7.27 |
| 2010/0241698 | A1* | 9/2010 | Hillerbrand | 709/203 |
| 2011/0071869 | A1* | 3/2011 | O'Brien | G06Q 10/06 705/7.12 |
| 2011/0202866 | A1* | 8/2011 | Huang et al. | 715/779 |
| 2012/0095798 | A1* | 4/2012 | Mabari | G06Q 10/06311 705/7.15 |

* cited by examiner

SYSTEM AND METHOD FOR TIMELINE MANAGEMENT OF OBJECTS

RELATED APPLICATIONS

This application claims the benefit of priority under 35 U.S.C. § 119(e) to U.S. Provisional Patent Application 61/387,779, entitled "SYSTEM AND METHOD FOR TIMELINE MANAGEMENT OF CONTENT," filed Sep. 29, 2010, which are fully incorporated by reference herein.

BACKGROUND

Many companies have large websites that require management of 100,000s and even millions of objects or content items (web pages, images, documents or other content items). Traditionally, these items have been managed using a file system view. Such a view, however, becomes cumbersome when there are a large amount of items and does not give access to important metadata used during the workflow of an object. Therefore, a new method of visualizing and managing objects is required.

SUMMARY

Example embodiments relate to systems and methodology for timeline management of objects.

At least one embodiment includes a system for managing objects. The system may include a processor configured to provide a set of objects in a repository with associated metadata including workflow metadata. The system may also include an application program interface and a non-transitory computer readable medium storing instructions to determine a first region of interest in a graphical user interface, the first region of interest corresponding to a first time range including future time segments. The non-transitory computer readable medium may further store instructions to retrieve through the application program interface metadata for a first set of objects having workflow metadata indicating at least one event will occur within the first time range create a first set of nodes representing the first set objects. Also, the computer readable medium may further store instructions to display the first set of nodes on a timeline in the graphical user interface for the first region of interest based on a time characteristic of the workflow metadata associated with the at least one event, and perform an action on a corresponding object from the first set of objects within the repository based on a user interaction with a node within the first region of interest.

In a further example embodiment, the non-transitory computer readable medium may further store instructions to determine a second region of interest on a graphical user interface corresponding to a second time range and retrieve through the application program interface metadata for a second set of objects having workflow metadata indicating at least one event will occur within the second time range. In the further example embodiment, the non-transitory computer readable medium may also include instructions to create a second set of nodes representing the second set of objects in the second region of interest, and display the determined second set of nodes on the timeline in the graphical user interface for the second time range based on a time characteristic of the workflow metadata associated with the at least one event. The instructions stored on the non-transitory computer readable medium may also perform an action on a corresponding object from the second set of objects within the repository based on a user interaction with a node within the second region of interest.

In another example embodiment, the determined first set of nodes are displayed on a first timeline in the graphical user interface and the determined second set of nodes are displayed on a second timeline in the graphical user interface.

In a further example embodiment, the determining the second time range is based on a user panning the graphical user interface to the second time range.

In another example embodiment, the non-transitory computer readable medium may further store instructions to display a density view with a number representing an amount of the events occurring within each of the time segments.

In a further example embodiment, the non-transitory computer readable medium further stores instructions to display a plurality of filter options in the graphical user interface, and determine that a user has selected at least one of the filter options in the graphical user interface. The stored instructions may further filter the determined first set nodes based on the selected at least one filtering option, and display the filtered first set of nodes in the graphical user interface.

In another example embodiment, the non-transitory computer readable medium may store instructions to determine that a user has selected a node in the graphical user interface from the displayed first set of nodes, retrieve additional metadata associated with the selected node through the application program interface, and display the additional metadata for the selected node in the graphical user interface.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments, and wherein.

DETAILED DESCRIPTION

Figure 1:
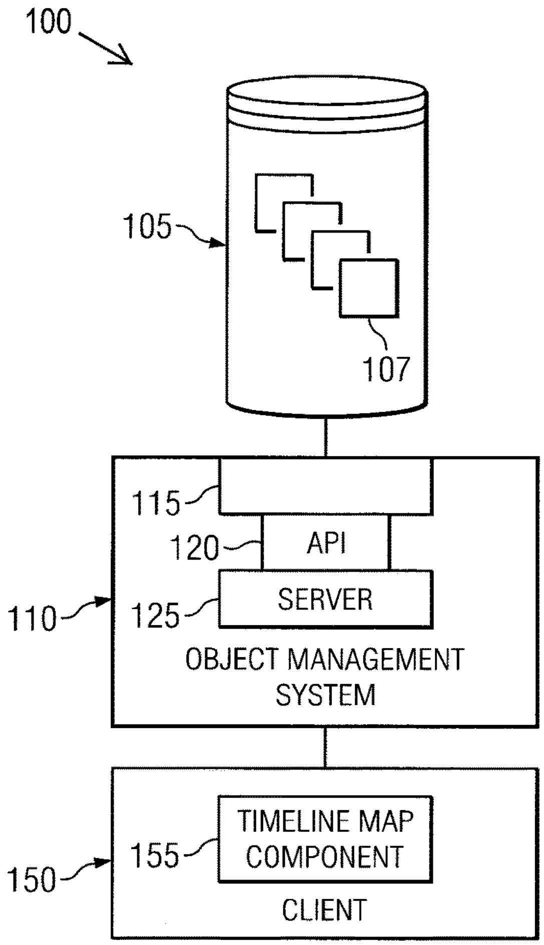
FIG. 1 illustrates a system for managing object items according to an example embodiment.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Embodiments described herein provide an intuitive system for viewing and managing objects and items along a timeline. Objects can be an entire web page, a component of a web page, an insertion into a web page, a graphic link, templates, program fragments, documents, configuration files, reference (link, indirect representation) to the said items, any other workflow related item, user objects, group objects, objects may represent departments processes, assets or other objects defined in a system. In one embodiment, a web site can be managed as a set of objects corresponding to content items, channels and sites linked together to form a site structure.

FIG. 1 illustrates a system 100 for managing objects 107. Objects 107 may be stored in a repository 105. In some cases, rather than storing the objects 107, repository 105 can include references to another system and its corresponding objects or repository. For example, a bank statement may reside in an enterprise system, but object management system 110 can access it. Further, the repository 105 may store metadata for the corresponding objects 107. The metadata stored for the objects 107 in the repository 105 can include workflow metadata corresponding to a project or process. For purposes of managing a web site, such metadata may include workflow metadata such as whether the object has been approved for publication, whether it was published, or any other information that is useful in classifying the object for web site management. It should be noted that while object management program 110 may manage an object 107, the object 107 may be stored at another location and a reference to the object stored in repository 105.

The workflow metadata may relate to a sequence of related projects, operations or work that may be performed by a person, a group of persons, an organization. Also, the workflow metadata that is stored in the repository 105 may include scheduling information such as a date and time corresponding to events. For example, the workflow metadata may indicate a time and date for events such as when an object 107 was or may be approved for publication, the object was or can be published, any past action taken on an object or any future action to be taken on an object 107.

The objects 107 may be managed by an object management system 110. The object management system 110 includes object management software 115 and provides an API 120 through which objects or information about the objects can be retrieved. A server component 125 can act to receive and process requests from clients, such as a client computer 150.

The client computer 150 can include a timeline program 155. According to one embodiment, timeline program 155 can be a software framework for interacting with API 120. Timeline program 155 can be a standalone program, a plug-in to a web browser, a portion of another program or otherwise implemented according to suitable software architecture. In one embodiment, timeline program 155 can be an Adobe Flash program, a Java program, a scripting language, or an AJAX (Asynchronous JavaScript and XML) application.

During object management workflow, various actions take place on objects (or items) with corresponding metadata stored in the repository 105. More so, object management systems may track when events took place or when events are scheduled to take place. For example, an object may be approved for publication, the object 107 can be published or other action taken. According to embodiments of the present application, the date by which an event is due in the future can also be tracked. Objects, according to one embodiment, can be associated with a job object that has, as part of its metadata, a due date(s) for an event(s). In other embodiments, the metadata of each object can include a due date(s) for an event(s). Further, if actions are taken on the object on the timeline program 155, the corresponding metadata within the repository 105 may be changed or modified to reflect the action taken on the object.

In operation, timeline program 155 generates a view of the objects 107 in repository 105 based on the date and/or time at which events occurred or are scheduled to occur with respect to the objects. The view represents objects 107 as nodes laid out in a time ordered sequence on the timeline. In some cases, the nodes are generic. In other embodiments, the nodes are specific to an object type, a user type, or other classification (e.g., a document picture for document items, a picture frame for images and so on). In yet another embodiment, the nodes can present a thumbnail image of the corresponding object. The number of nodes rendered at any one time may be limited. Further, the timeline program 155 may be rendered according to a breadth first, depth first or any other scheme based on a region of interest in a graphical user interface.

As the user changes views and interacts with the user interface, timeline program 155 can send requests for additional information to object management system 110 to retrieve information about additional objects. Further, a user may change interact with the interface by panning the interface to change the displayed dates on the timeline program, or zoom in or out on the time line program.

As mentioned above, content items or objects 107 can be stored as corresponding objects in a repository 105 with associated metadata. In some cases, rather than storing the objects, repository 105 can include references to another system and its corresponding objects or repository). The objects can be managed by an object management system 110. The object management system 110 includes object management software 115 and provides an API 120 through which objects or information about the objects can be retrieved. A server component 125 can act to receive and process requests from clients.

Figure 2:
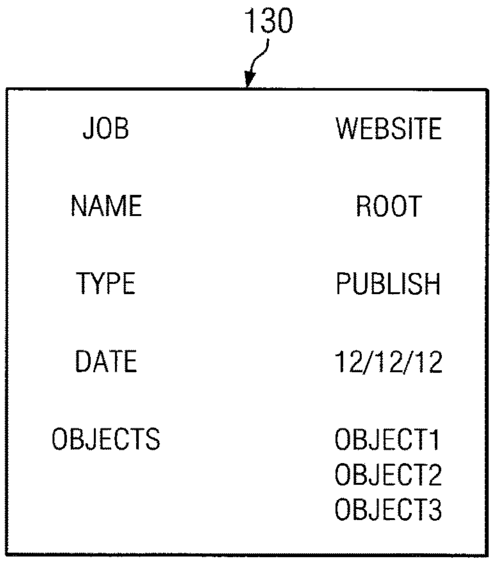
FIG. 2 represents an object according to an example embodiment.

FIG. 2 is provided by way of an example of an object 130 within the timeline program 155. The object 130 may have various metadata fields. For example, the object 130 may have metadata for a name of the object 130, a type of the object, a date an event(s) is scheduled to take place or has taken place, and associated objects. For example, the object 130 may be associated with a specific website and may be given a name based on the objects within the object 130.

Further the object 130 may be scheduled to publish or be unpublished from a website on given dates. Also, each object 130 may have various or numerous events scheduled to take place. For example, an object 130 may be scheduled to be reviewed, uploaded and published on a first date and to be unpublished on a second date. Therefore, the object 130 may include metadata for each event that is scheduled to take place.

Figure 3:
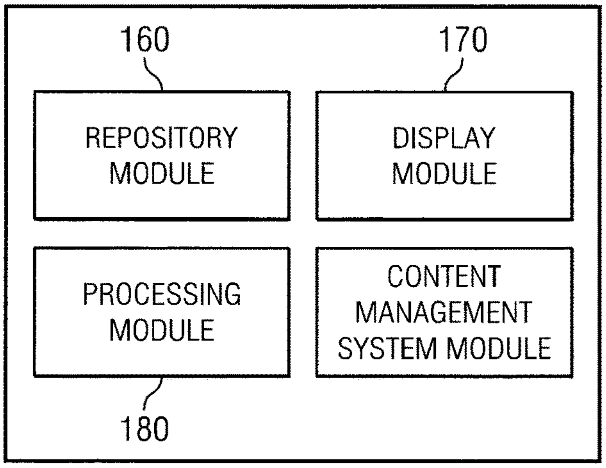
FIG. 3 represents a system for managing object items according to an example embodiment.

FIG. 3 illustrates an embodiment of timeline code (e.g., timeline program 155) at a client computer 150. The computer client 150 may include a plurality of modules or processors such as a repository module 160, a display module 170 and a processing module 180. Further, each of the above mentioned modules may be a processor or device.

The repository module 160 may be configured to retrieve metadata corresponding with a set of objects in the repository 105. Further, the repository module 160 may be configured to issue requests to modify and/or update the metadata within the repository module 160 based on user interactions with the graphical user interface of the timeline program 155. According to one embodiment, repository module 160 may be an object management system interface module that issues requests to an object management system API.

The display module 170 may be configured to display the graphical user interface of the timeline program 155 on a display of the computer client 150. The display module 170 may automatically update or change the displayed timeline program 155 based on the actions and/or commands of the user on the graphical user interface. Accordingly to one embodiment, the display module 170 may receive user input as the user interacts with the graphical interface. The display module, for example, can determine the portion of a view of the timeline program that the user is attempting to view based on the user's viewing position in the timeline program and can provide this information to processing module 180. Additionally, display module 170 may receive information provided by processing module 180 and display the information in the appropriate positions in the timeline program.

In another embodiment, the display module may be configured to receive commands from the processing module if the user desires to change a region of interest on the graphical user interface by features such as panning. The user may also zoom in and zoom out. Based on the received commands or instructions from the processing module 180 the display module 170 may be configured to automatically update the displayed timeline program 155. More specifically, if the user changes the level of zoom of the timeline program 155, the display module may increase or decrease an amount of displayed metadata for each object. Further, the user pans the graphical interface, the display module may automatically change the displayed set of nodes and metadata based on the panning.

The processing module 180 may be configured to determine a first set of nodes representing objects that are displayed on a view of the timeline program on the graphical user interface. The processing module 180 may be further configured to request that the object management system 110 take an action on a corresponding object or item in the repository 105 based on an interaction by the user on the displayed nodes as detected by display module 170. According to one embodiment, processing module 180 may receive metadata for objects from repository module 160 and determine the relationships between the objects, thereby determine the co-positions of corresponding nodes in a hierarchy. Furthermore, the processing module may determine a type of view displayed on the graphical user interface. For example, a user may desire to view a view representing event that will take place over a time period, or display a density view representing the total number of events scheduled to take place over a time period.

FIG. 3 is provided by way of example and the various modules described can be portions of separate programs, portions of the same code or may be otherwise implemented. The processes of FIG. 3 may be implemented on a single device or may be distributed across multiple devices.

Figure 4A:
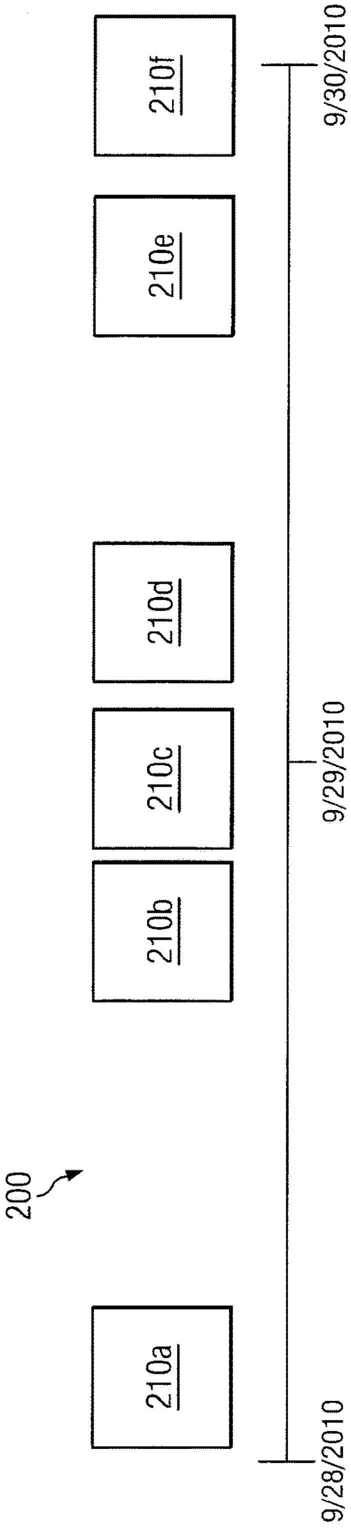
FIGS. 4A and 4B represent a timeline view in a system for managing object items according to an example embodiment.

FIG. 4A illustrates one embodiment of a view 200 of a set of objects displayed on a timeline view. When a user first opens timeline program 155, timeline program 155 can build a view from a default setting. For example, if the current date is Sep. 29, 2010, timeline program 155 can build a timeline centered on that current date. Further, the default setting may be to build a timeline view based on the time view currently displayed on the display.

Timeline program 155 can query the object management system 110 for all objects for which certain events occurred or for which events are scheduled to occur. The date range for which information is retrieved can be set or selected by the user. In some cases, information for objects that are not yet displayed to the user can also be retrieved (e.g., timeline program 155 can request information about nodes with due dates on Sep. 30, 2010-Oct. 5, 2010).

Timeline program 155 can be configured to display nodes in the date range based on the types of events that have occurred or are scheduled to occur. For example, timeline program 155 can display all nodes corresponding to objects that were published or have a due date to be published in the date range. In another example, timeline program 155 can display all nodes for objects that were published in the date range or have a due date for approval and/or publication in the date range. The timeline may also give an indication if a due date has passed for an object. For example, a flag may be set to display an object as a required, desired, or predetermined color if an object has passed a due date.

According to one embodiment, the user can scroll the timeline using user interface methods known or developed in the art. As the user scrolls to nodes for which information is not loaded, the user may scroll to a new time period in the timeline program 155 and the user can request additional metadata for additional objects in the object management system 110. Accordingly, the object management system 110 may retrieve metadata for the new objects within the new time period.

Figure 4B:
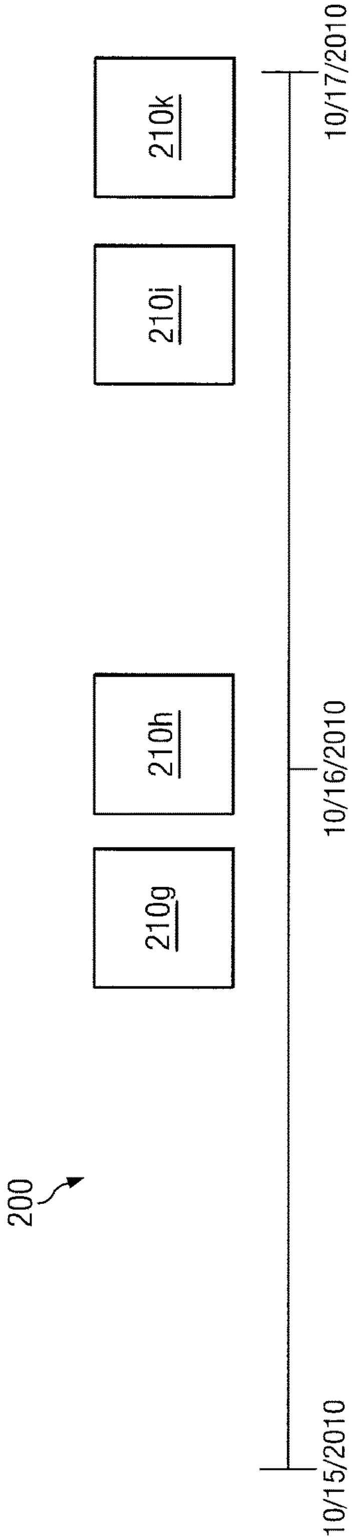

For example, if timeline program 155 initially loads information for nodes 210*a-f*, but the user then scrolls to the right, timeline program 155 can load information for additional nodes. Thus, for example, if the user scrolls to the right on the timeline of FIG. 4A to display the date range of FIG. 4B, timeline program 155 can retrieve metadata and available actions for nodes 210*g*-210*k*. Additionally, upon a user scrolling to a new time period in the graphical user interface, the metadata corresponding to the previous time period may become stale. Therefore, the metadata for the old time period (as represented by FIG. 4A) may be deleted or removed from a processor on the client computer 150 to save computer resources. Furthermore, a user may request in the graphical user interface that the timeline program 155 retrieve information about nodes or events that are outside of the displayed date range so that information about the additional nodes is preloaded when the user scrolls to those nodes.

Figure 5:
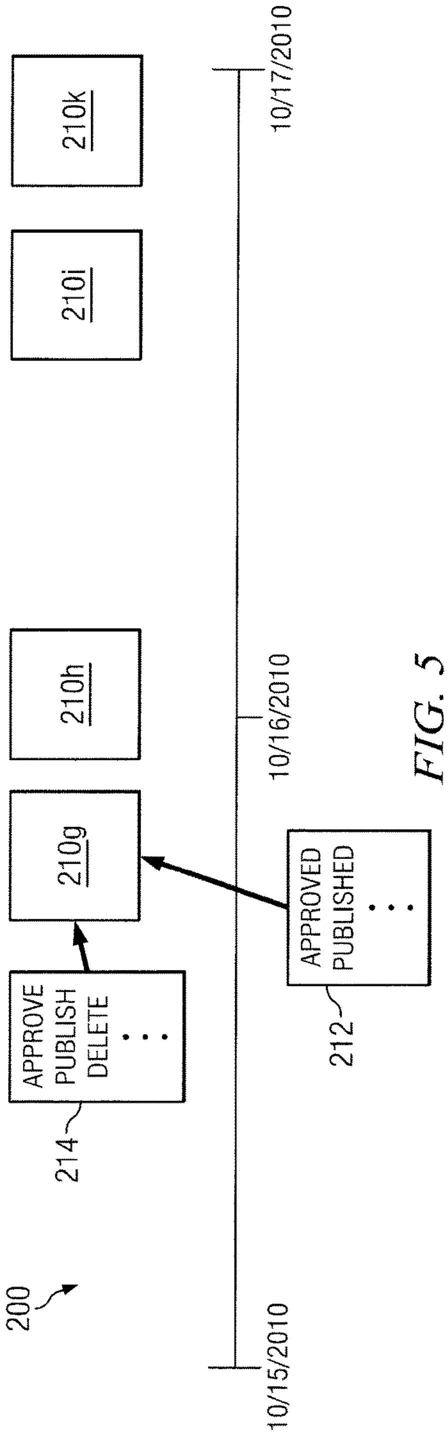
FIG. 5 illustrates a timeline view according to another example embodiment.

Various actions and metadata can be provided for each node in the timeline. For example, FIG. 5 illustrates that, when the user scrolls over node 210*g*, the user can be presented with status information 212 and possible actions 214. These can appear on scroll over, in context menus or be otherwise provided to the user. For example, in further example embodiments there may be a toolbar in the graphical user interface presenting options for further actions regarding each of the nodes. In another embodiment, the actions/information are placed in dropdown menus accessible from a node when a user hovers over a node in the graphical user interface. In some embodiments, the user's interaction can cause timeline program 155 to request new metadata from object management system 110. For example, timeline program 155 may wait until a user scrolls over node 210*g*, and hovers over node 210*g*, before retrieving some or all of information 212. In other embodiments, all the applicable information for node 210*g* can be retrieved when the user scrolls to node 210*g* in the timeline.

The amount of metadata initially retrieved by timeline program 155 and/or the amount retrieved when a user scrolls to a node and the amount retrieved when the user performs some other interaction with the user interface can depend on the configuration of timeline program 155. In some embodiments, for example, timeline program 155 can request a first set of metadata about a node when the user opens the program, a second set of metadata for a node when the user scrolls to the node and an additional set of when the user clicks on the node. Thus, timeline program 155 can be configured to lazy load information about nodes in desired manners. In other embodiments, timeline program 155 can request all applicable metadata about all nodes for a time range when it initially renders view 200 (including nodes not in the region of interest of the user).

Figure 6:
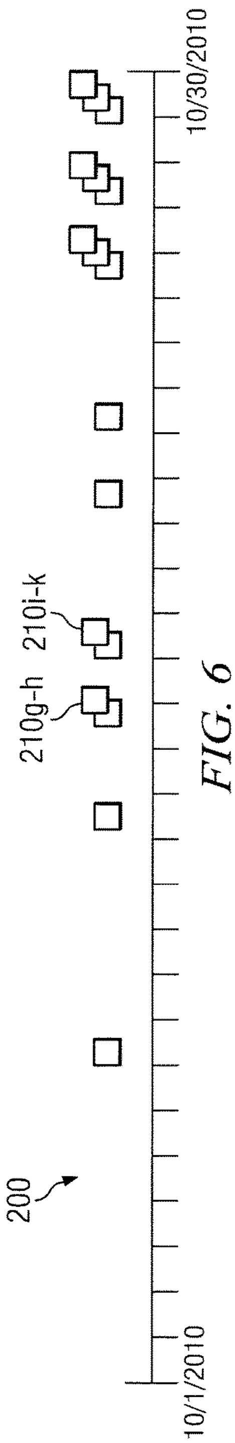
FIG. 6 illustrates a timeline view according to another example embodiment.

In some cases, a user may wish to view a larger timeline spanning over a greater time period. FIG. 6 for example illustrates a view of the graphical user interface of the timeline program 155 having a longer date range than as illustrated in FIG. 5. Depending on configuration, timeline program 155 may not make all the information and actions for a node available in certain views. Thus, for example, while the user can see that objects 210*g-h* require an action on Oct. 16, 2010, the user does not see the information and available actions until the user zooms in on that portion of the timeline. As the user zooms in on the timeline (e.g., to the view of FIG. 5), timeline program 155 can request additional about nodes 210*g-h*.

The user may "zoom" into data for a particular day or other time period. For example, according to one embodiment, when a user requests a new view (e.g., by clicking "day" button in interface 400), timeline program 155 can send an additional request by requesting data for a particular day. The data returned in response to monthdataurl can be allowed to go stale. In such an embodiment, timeline program 155 only requires memory to store data for the current view, not all possible views. Accordingly, if a user performs actions on the graphical interface to change or modify the displayed view, the data associated with the previous view in the timeline program 155 may go stale, invalid or is no longer stored in a memory for the timeline program 155.

In another embodiment, timeline program 155 can apply date filtering locally to render the day view.

Figure 7:
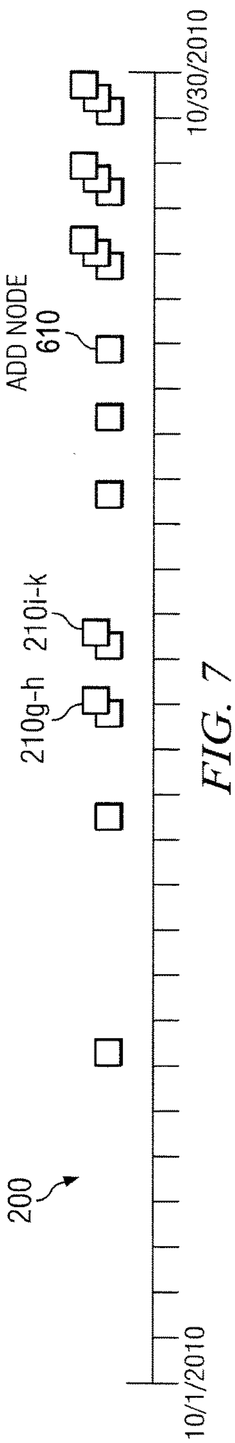
FIG. 7 illustrates a timeline view according to another example embodiment.

Furthermore, in some embodiments a user in the graphical user interface may desire to add a new node with various events occurring on a date within the timeline viewed on the graphical user interface. For example, in FIG. 7, a user may desire to add new node 610 to the embodiment as shown in FIG. 7. As shown in FIG. 7, the user may select a certain date to add a new node, and the user may select an Add Node feature on the graphical user interface. The Add Node feature of the timeline program may be made available to a user by any hovering over a desired date to add the new node, and selecting the date. In other embodiments, an Add Node feature may be presenting in a toolbar of the graphical user interface.

Subsequently, the user may desire or may be required to enter information about the new object represented by the new node. For example, may desire that an additional web page be published on a certain date. Therefore, the user may select the Add Node feature on the graphical user interface and enter a date that the web site is to publish. In further example embodiments, the user may enter various dates for events for each object. For example, dates the object is to become empty/populated, un/approved, in/active, un/published, and/or un/locked.

Additionally, timeline program 155 can open dialogs to allow the user to upload or create objects corresponding to the new nodes. For example, users may upload data of content for the objects for the new nodes. This may also include initializing other programs to allow for object creation.

Figure 8:
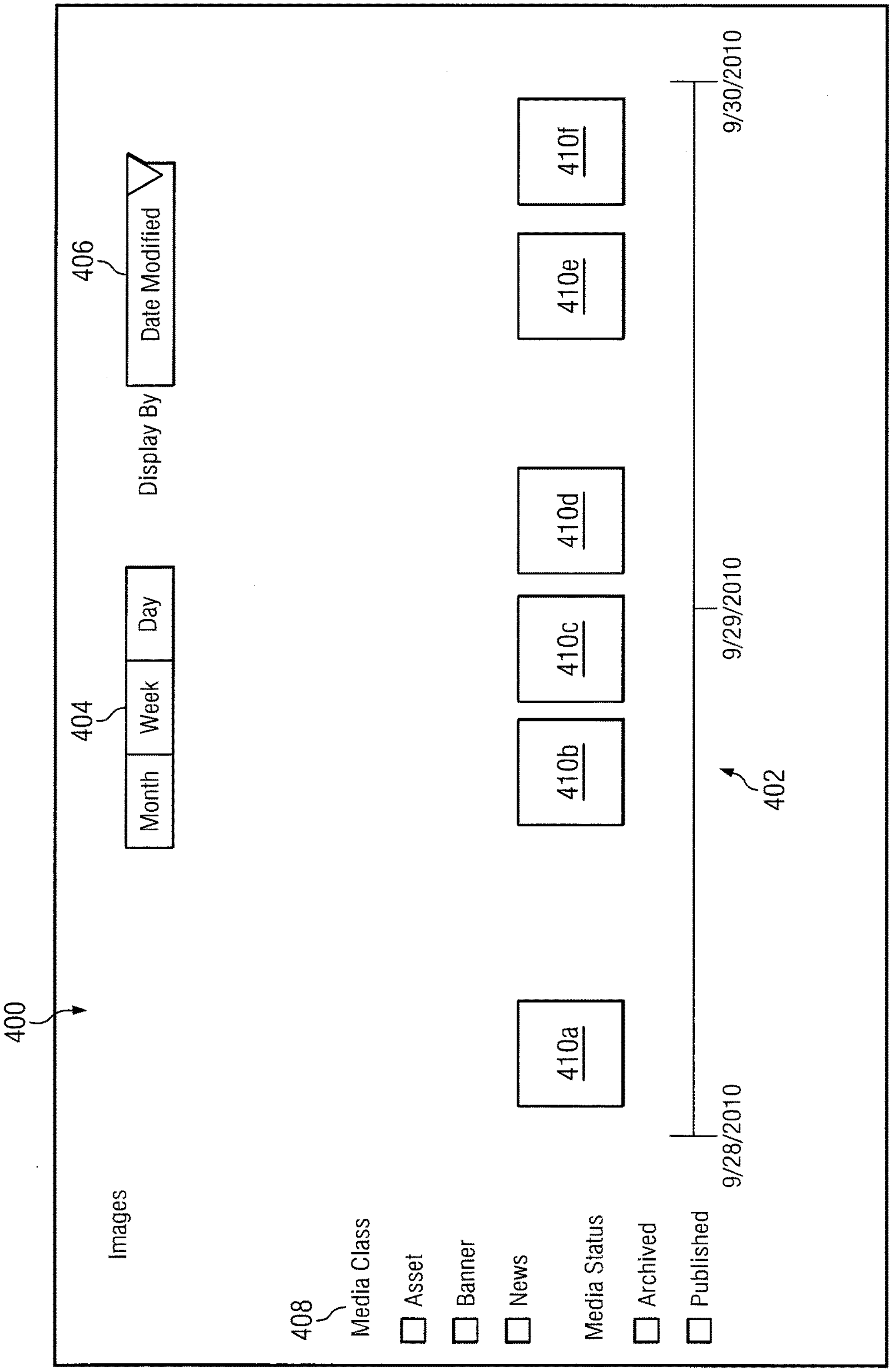
FIG. 8 illustrates a graphical user interface view according to another example embodiment.

FIG. 8 is a diagrammatic representation of another embodiment of a user interface 400 for displaying a timeline 402 of images 410. In FIG. 8, the user can be given the option to filter the objects to be displayed based on the type of event that occurred/to occur on each date (modified, created, scheduled publish, scheduled unpublished, last published, last unpublished or other action), media class (asset, banner, content, feature, gallery, news, promotion, teaser or other defined class), status (approved/unapproved, published/unpublished or other status), objects (image, file, video, rich component or other item type), time (today, yesterday, past 7 days, next 7 days, or other time specification) or other information about an object (e.g., locale). Thus, for example, the user can request a timeline view that shows only images with approved status by publish date.

Further in FIG. 8, the user can select a view (month, week, day) using option buttons 404. Depending on the view selected, timeline program 155 can display data for the selected time period. The user can also select how objects are displayed at 406 (e.g., by date modified, date created, date scheduled publish, date scheduled unpublished, data last published, date last unpublished). Additionally, interface 400 can include radio buttons at 408 to filter the items displayed by class and status.

In the example of FIG. 8, timeline program 155 can send requests to object management system 110 based on the item type (e.g., images), view and options/filters selected. Thus, for example, if a month view is selected for image items and the media class asset filter is applied, timeline program 155 can request the month data for all images of the asset class. If the user switches the asset class, timeline program 155 can send another request.

In another embodiment, timeline program 155 can request all (or some subset) of metadata for the month (or other time period) and perform the filtering on the metadata without making a separate request when the user changes the date range (e.g., to week), asset class or other parameter. This can improve performance of the filtering experience. Additionally, according to one embodiment, timeline program 155 can register to be notified of changes by the object management system 110. In other words, timeline program 155 can establish a connection and register for updates since it last received data to drive the display. Then, if object management system 110 modifies any of the data, it can "push" or notify registered clients that the changes took place. This can be done either where the connections are established as needed over time or where the client establishes the connection and maintains it for the notifications.

The information displayed to the user is based on requests made by timeline program 155 to object management system 110. As the user interacts with the timeline view (e.g., by panning, zooming, clicking on options or undertaking other interactions), timeline program 155 can request information from object management system 110 or perform local filtering of information already returned by object management system 110.

Further, while panning, zooming, or clicking on options or undertaking other interactions, timeline program 155 may request additional metadata corresponding to the displayed objects from the repository 105. The additional metadata corresponding to the displayed objects may include workflow metadata indicating the creator or author of the objects, purpose of the objects, placement on a network where the data was created, or any other information related to the objects stored in the repository. Also, the additional metadata may be selected by a user to filter and/or select which objects are displayed on the interface 400. This may include re-retrieving metadata for the previously retrieved nodes or only retrieving metadata for the additional nodes.

Server program 125 can be configured to process requests from timeline program 155 to request and return data to timeline program 155. According to one embodiment, timeline program 155 can pass a URL to object management system 110 that causes timeline program 155 to return data based on the parameters in the request. For example, example generic requests for month data can be of the form:

```
[monthdataurl]?typeid=[typeid]&classid=[classid]&localeid=
[localeid]&statusid=[status id]&eventid=[eventid]&initialdate=
[yyyy-mm-dd]&finaldate= [yyyy-mm-dd]
```

When server program 125 receives the [monthdataulr] it can make the appropriate API calls to retrieve the requested data and send the requested information back.

In some cases, it may be desirable not to limit the objects for which information is requested based on a particular parameter. For example, timeline program 155 can request information about objects regardless of locale (for example, by default or if a user selects "any locale" in the user interface). In such a case, the locale parameter can be dropped:

```
[monthdataurl]?typeid=[typeid]&classid=[classid]&statusid=
[statusid]&eventid=[eventid]&initialdate=[yyyy-mm-dd]&finaldate=
[yyyy-mm-dd]
```

The above example is for retrieving information about objects for a particular a month. Other requests can be made such as to retrieve data for a week, retrieve information for a particular object type or other requests.

Timeline program 155 can also send requests to object management system 110 to cause events to occur. The following is a list of example action requests:

```
<approveurl
type="httpAPI">/contentservices/xapi/xml/approveItem?id=</approveurl>
<unapproveurltype=
"httpAPI">/contentservices/xapi/xml/unApproveItem?id=</unapprove url>
<editurl type="invokeEvent">doEdit</editurl>
<deleteurl type="httpAPI">/contentservices/xapi/xml/deleteItem?id=
</deleteurl>
<automationurl type=
"invokeEvent">automationsList</automationurl> <TBD>
<publishurl type="invokeEvent">publishItem</publishurl>
<unpublishurl type="invokeEvent">unPublishItem</unpublishurl>
```

Returning to the example of FIG. 8, when timeline program 155 is opened, timeline program 155 can send requests to retrieve information applicable to the dropdown menus. For example, timeline program can send a request /content/xapi/xml/getMetadata?typeid=image<http://10.96.8.231:27110/content/xa pi/xml/getMetadata?typeid=image>. According to one embodiment, object management system 110 can return an XML structure providing the metadata for typeid=image (or other object type, as the case may be). Timeline program 155 parses the XML document to populate filters, dropdown menus or other items.

If the user selects the month view, but no filters, timeline program 155 can send a request to object management system 110 for:

[monthdataurl]?typeid=image&initialdate=[yyyy-mm-dd]&finaldate=[yyyy-mm-dd].

Object management system 110 will perform a process to return the month data for all images that had an event occur or have an event scheduled between the dates. Timeline program 155 can display the nodes for objects by date modified on timeline 402.

In another embodiment, timeline program 155 can request:

[monthdataurl]?typeid=image&eventid=modify&initialdate=[yyyy-mm-dd]&finaldate=[yyyy-mm-dd].

In this case object management system 110 will only return the identifications and information for the objects that had a modify event during the specified time period.

It should be noted that some of the metadata for an object may be defined by other objects. For example, scheduling information may be defined for a job object that references the object. Even if the scheduling information is not directly associated with the object, it is associated with the object through the job object. Therefore, when object management system 110 receives a request for information about an object, object management system 110 may collect metadata for the object based on metadata inherited from or defined for other objects.

According to one embodiment, timeline program 155 can send requests for additional metadata using URL requests of Table 1. These requests are compatible with APIs for a Vignette Object Management System or Open Text Web Experience Management system.

TABLE 1

| | View Type | REST URL |
|---|---|---|
| Login | Xml | /login?username=admin&password=admin |
| Get all projects | xml, xhtml | /listProjects |
| Get the Diagnostics | xml | /xmlDiagnostic |
| List all automations | xml | /listAutomations |
| Get all categories | xml | /listCategories |
| Get all common metadata | xml, xhtml | /getMetadata |
| List all sites | xml | /listSites |
| Get all channels for the selected site | xml | /listSiteChannels?siteId=55bb000a4b6f3110VgnVCM100000d22315acRCRD |
| Associate content item to channels | xml | /assignChannels?contentInstanceId=4038650346144110VgnVCM100000782515acRCRD&channelId=7948f1b21d344110VgnVCM100000782515acRCRD&channelId=0448f1b21d344110VgnVCM100000782515acRCRD |
| Unassign channels | xml | /unAssignChannels?id=4038650346144110VgnVCM100000782515acRCRD&channelId=7948f1b21d344110VgnVCM100000782515ac |
| Assign categories to Content item | xml | /assignCategories?id=1503ddc9261f3110VgnVCM100000d42415acRCRD&categoryPath=/test1-category&categoryPath=/test2-category |
| Unassign categories | xml | /unAssignCategories?id=1503ddc9261f3110VgnVCM100000d42415acRCRD&categoryPath=/test1-category&categoryPath=/test2-category |
| Approve Content item | xml, json | /approveItem?id=4bd2ddc9261f3110VgnVCM100000d42415acRCRD |
| View Approval status | xml | /viewItemStatus?id=22e81735b38f3110VgnVCM100000d42415acRCRD |
| View Content item details | xml | /getItem?id=22e81735b38f3110VgnVCM100000d42415acRCRD |
| Delete the content item | xml, json | /deleteItem?id=22e81735b38f3110VgnVCM100000d42415acRCRD |
| Touch a content item to update time | json | /touchItem?id=22e81735b38f3110VgnVCM100000d42415acRCRD |
| Publish content item | xml | /publish?id=4bd2ddc9261f3110VgnVCM100000d42415acRCRD |
| Unpublish Content Item | xml | /unpublish?id=4bd2ddc9261f3110VgnVCM100000d42415acRCRD |
| Version content item | xml | /createVersion?id=4bd2ddc9261f3110VgnVCM100000d42415acRCRD&label=<label>&comment=<comment> |
| Version content item | xml | /restoreVersion?id=4bd2ddc9261f3110VgnVCM100000d42415acRCRD&versionNum=1 |
| List all versions of the content item | xml | /listVersion?id=4bd2ddc9261f3110VgnVCM100000d42415acRCRD |
| Get details of the selected version | xml | /getVersionItem?id=22e81735b38f3110VgnVCM100000d42415acRCRD&versionNum=4 |
| Delete a Version for a content item | json | /deleteVersion?id=4bd2ddc9261f3110VgnVCM100000d42415acRCRD&versionNum=1 |
| Show recent static files added by user | xml | /getRecentFiles?user=vgnadmin&maxCount=5 |
| Filter | xml | /filter |
| Search | xml | /search?keyword=sampleImage |
| Add an item to shelf | Json | /addShelf?id=22e81735b38f3110VgnVCM100000d42415acRCRD |
| Remove an item from shelf | Json | /removeShelf?id=22e81735b38f3110VgnVCM100000d42415acRCRD |
| Gets the shelf details for given filter criteria | xhtml | /ShelfFilterDetails?filtercriteria=All&selectedCategory=Recent |
| Create Content Item | Xml | /createItem |

TABLE 1-continued

| | View Type | REST URL |
|---|---|---|
| Update Content Item | Xml | /updateItem |
| Upload multiple media items | Json | /uploadMediaItems |
| Edit Image | Json | /editImage?id=22e81735b38f3110VgnVCM100000d42415acRCRD&imageName=<imageName>&sourcebase64=<sourcebase64> |
| Resize Image | Json | /resizeImage?sourceImage=<sourceImage>&actionName=<actionName>&width=<width>&height=<height>&placementPath=<placementPath> |
| Resubmit file | Json | /resubmitFile?placementPath=<placementPath> |
| To upload a static file | Json | /uploadStaticFile?projectPath=<projectPath> |
| Get Tags with the specified pattern | Json | /getTag?pattern=<pattern> |
| Edit tag for a content item | Json | /editTag?id=22eS1735b38f3110VgnVCM100000d42415acRCRD&tag=<newtag>&oldTagString=<oldTagString> |
| Display Tag for a content item | Json | /displayTag?id=22e81735b38f3110VgnVCM100000d42415acRCRD |
| Get items with the tag name | Xml | /displayTagSearch?tagName=<tagName> |
| Render a static file with the given placement path and version number | Xml | /renderFile?placementPath=/RichMediaSample/Assets/Images/lit_tn.jpg&versionNum=0 |
| Get richmedia Home Page Items | Xml | /HomeItem |

For example, if a user selects a node in the timeline view for which approval status is not yet loaded, the timeline program can send the request "/viewItemStatus?id=22e81735b38f3110VgnVCM100000d42415acRCRD" to request the approval status for object "22e81735b38f3110VgnVCM100000d42415acRCRD." When the user moves to a different part of the timeline, the approval status for object 22e81735b38f3110VgnVCM100000d42415acRCRD can be allowed to go stale at client computer 150.

In another embodiment, the request for a URL, such as [monthdataurl] can cause object management system 110 to return specified metadata for each object meeting the specified parameters. The returned metadata may include information such as approval status and other information. Thus, a single request for information may return any number of pieces of metadata about any number of objects depending on configuration.

Table 1 is provided by way of example and not all actions/information may be available through timeline program 155 and, in other embodiments, other actions/information may be available. Additionally, the requests can be modified for other APIs and object management systems.

Figure 9:
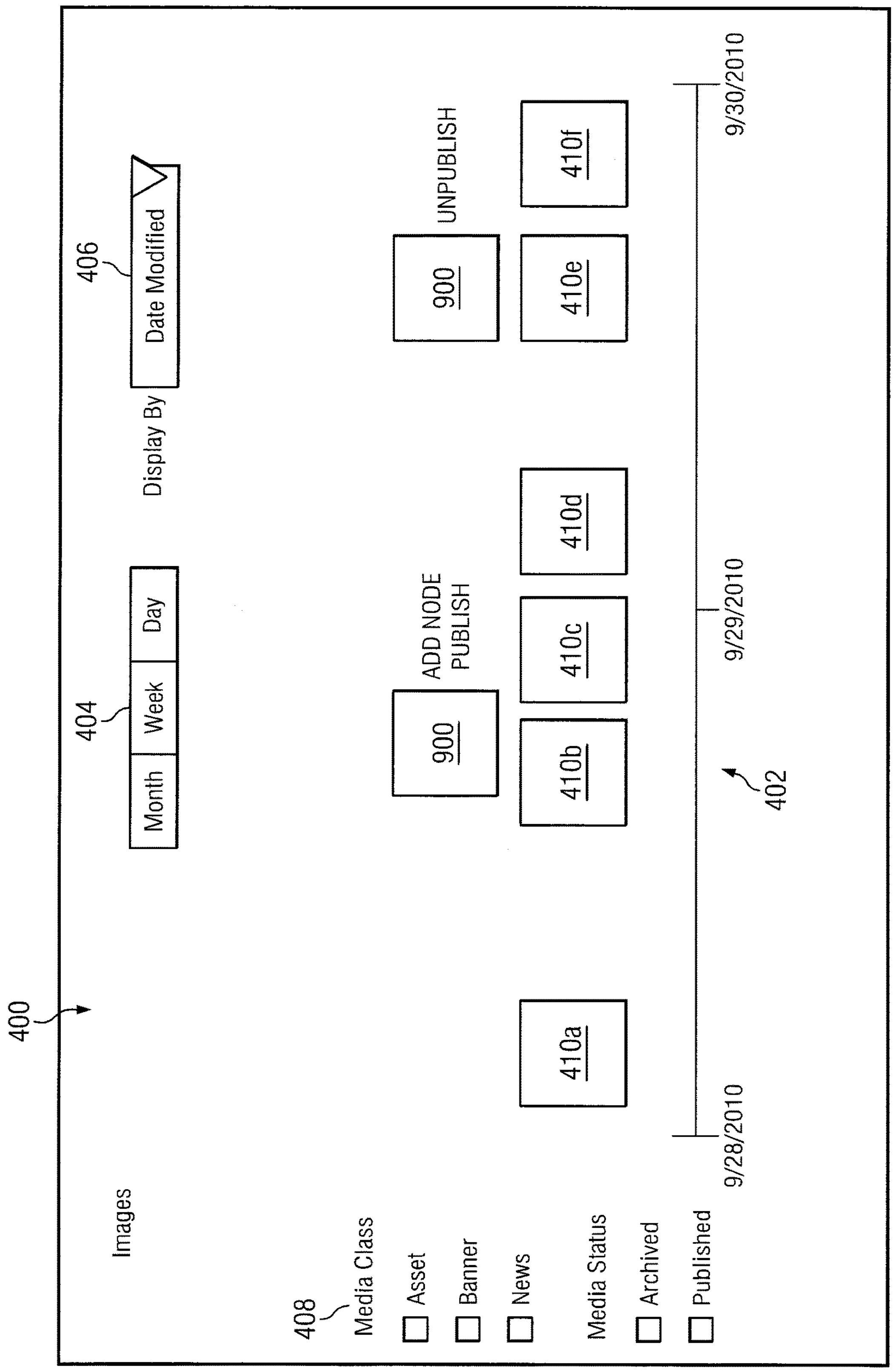
FIG. 9 illustrates a graphical user interface view according to another example embodiment.

FIG. 9 is a diagrammatic representation of another embodiment of a user interface 400 for displaying the timeline 402 of images 410 and adding a new node to the region of interest.

In the timeline 402, a user may add a new object in the user interface 400. The new node 900 may be related to other objects that have events occurring on the same day. Furthermore, the new node 900 may have additional events such as dates to be approved, published, and unpublished. Accordingly, a user may enter data regarding each event for the new node 900. Furthermore, each event for the new node 900 may show up on the corresponding date on the time line. For example, in the timeline 402 in FIG. 9, new node 900 may have been scheduled to publish on Sep. 29, 2010, and schedule to be unpublished on Sep. 30, 2010. Accordingly, as shown in FIG. 9, new node 900 may appear to have events occurring on both Sep. 30, 2010 with appropriate status indicators.

Figure 10:
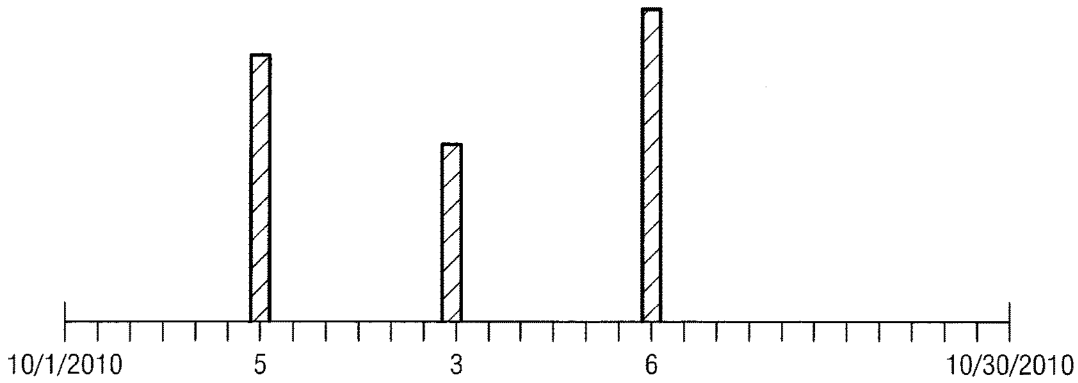
FIG. 10 illustrates a graphical user interface view according to another example embodiment.

FIG. 10 illustrates that timeline program 155 can display a density view that indicates how many events (or instances of certain type of event) occurred/will occur on certain dates. As such, timeline program 155 can present other views of returned metadata. This provides an easy visual indicator of workload on different dates.

According to one embodiment as shown in FIG. 10, a timeline view showing nodes or densities can be used to compare workloads at different times. For example, the user can request data for multiple date ranges and the data displayed in a manner that allows comparison of the date. For example, the user can request information for Nov. 24, 2009-Dec. 24, 2009 and data for Nov. 24, 2010-Dec. 24, 2010 to compare workloads from the last Christmas season to the upcoming workload for this year's season.

Furthermore, the user of the graphical user interface may be presented with different options to view the nodes over a timeline. Therefore, the user may switch or change between the different views as illustrated in FIG. 4, 6, 8 or 10 on the graphical user interface.

Figure 11:
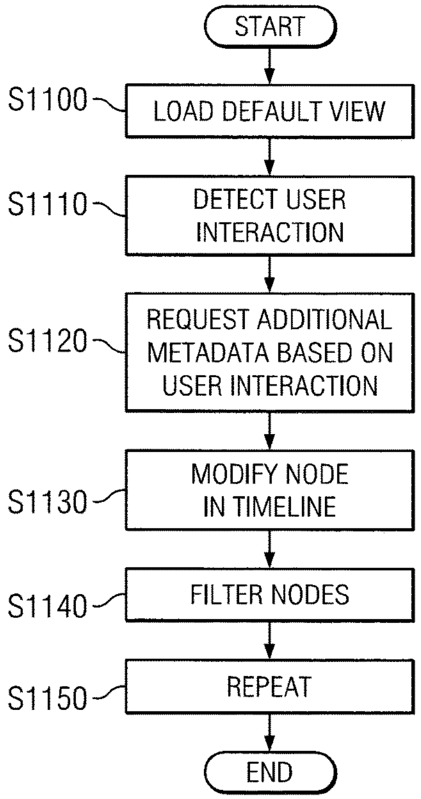
FIG. 11 represents a flow diagram for managing a timeline program according to an example embodiment.

FIG. 11 is a flow diagram representing an embodiment of a method for a user utilizing a graphical user interface of the timeline program.

In S1100, timeline program 155 may load a default view on the graphical user interface. For example, the default view may be a timeline view of the subsequent 30 days. Furthermore, the default view may be based on any user desired criteria or any previously programmed period. As part of loading the default view, the timeline program 155 may request metadata for each object that has an event occurring within a date to show in the default view on the timeline on the graphical user interface. Then, the display may display the events occurring within the timeline on the graphical user interface.

In S1110, timeline program 155 detects a user interaction in the graphical user interface that requires a change of view. For example, timeline program 155 can detect panning to the left or the right, modifying a level of zoom of the timeline, or changing the display style. If a user increases the level of zoom, the time period on the timeline may decrease and fewer nodes may be displayed on the graphical user interface, however more metadata for the remaining nodes may be displayed. Alternatively, if the user decreases the level of zoom of the graphical user interface, the time period on the timeline may increase and more nodes may be displayed. Furthermore, the user may desire to change the timeline to display a dentistry view illustrating the number events occurring on each date of the timeline in graphical form.

In S1120, based on the user interaction, the timeline program 155 may request additional metadata for the nodes having events occurring on the modified timeline from the object management system 110 through the application program interface 120. The client computer 150 may update the display to display the updated metadata while discarding the stale metadata to conserve computing resources.

In S1130, the timeline program 155 can detect a user interaction to modify a node in the timeline in the graphical user interface. For example, the user may change the date of an event or add a new event to a node. In response to the user's interaction, timeline program 155 may request that the metadata in the repository 105 be updated.

In S1140, timeline program 155 can detect that the user has selected a filter option in the graphical user interface. For example, the user may select to filter the displayed nodes based on type of event. Accordingly, the display will only display the filtered nodes.

In S1150, these steps of FIG. 11 may be repeated as needed or desired, may be performed in other orders, or other steps performed.

Thus, embodiments described herein provide a system and method for visualizing workflow. In one embodiment, a timeline program can request object identifications and corresponding metadata for objects having events occurring within a period of time. The timeline program can populate a timeline view with nodes representing the objects, the nodes arranged in a time ordered sequence based on a time (date, hour or other measure of time) that events occurred. As the user changes the dates viewed, filtering parameters or other parameters, selects actions or otherwise interacts with the timeline view, the timeline program can send corresponding requests to the object management system.

According to one embodiment, the timeline program only requests information for objects having events in particular time ranges. If the user changes the time range (e.g., by selecting a new view, panning to a new time or otherwise changing the time range), the timeline program can request new object ids and/or metadata to populate the new time line for the new time range. The timeline view can present available actions and metadata to a user for displayed nodes. In some cases the timeline can correspond to a single web site. In other embodiments, the timeline program can display nodes for multiple websites if a user is managing objects for multiple sites.

Embodiments described herein provide a significant reduction in effort in managing projects. Because workflow information is presented in an easy to understand format with workflow actions accessible through the timeline, the user can access objects and take actions on the objects with a reduced number of clicks. For a large website, this can significantly reduce the amount of time needed to deploy and maintain a site.

While the above embodiments have been discussed in terms of managing objects for a web site, embodiments can also be applied to other workflows and items. For example, a timeline view can be applied to a contract that needs legal approval, a blog entry, or policy that needs to be printed by a certain date, a response to a Freedom of Information Act request) or other item that requires an action. Thus, for example, various types of items can be included on a timeline view for a project. A timeline can show the documents that must be approved, the objects that need to published, regulatory documents that need to be filed all in a single timeline.

Embodiments described herein can be implemented in a computing environment having one or more client machines connected to one or more servers by a network. The network can be characterized as an internal network and/or external network. The Internet might be an example of an external network and a company's intranet might be an example of an internal network. Each network can be bi-directionally coupled to a variety of networked systems, devices, repositories, etc.

Virtually any piece of hardware or electronic device capable of running appropriate software may be a server or client. As an example, a computer may include a central processing unit (CPU), read-only memory (ROM), random access memory (RAM), hard drive or non-volatile memory, and input/output (I/O) device(s). An I/O device may be a keyboard, monitor, printer, electronic pointing device (e.g., mouse, trackball, etc.), or the like. The hardware configuration of the computer can be representative to other devices and computers alike coupled to the network (e.g., desktop computers, laptop computers, personal digital assistants, handheld computers, cellular phones, and any electronic devices capable of storing and processing information and network communication.

Figure 12:
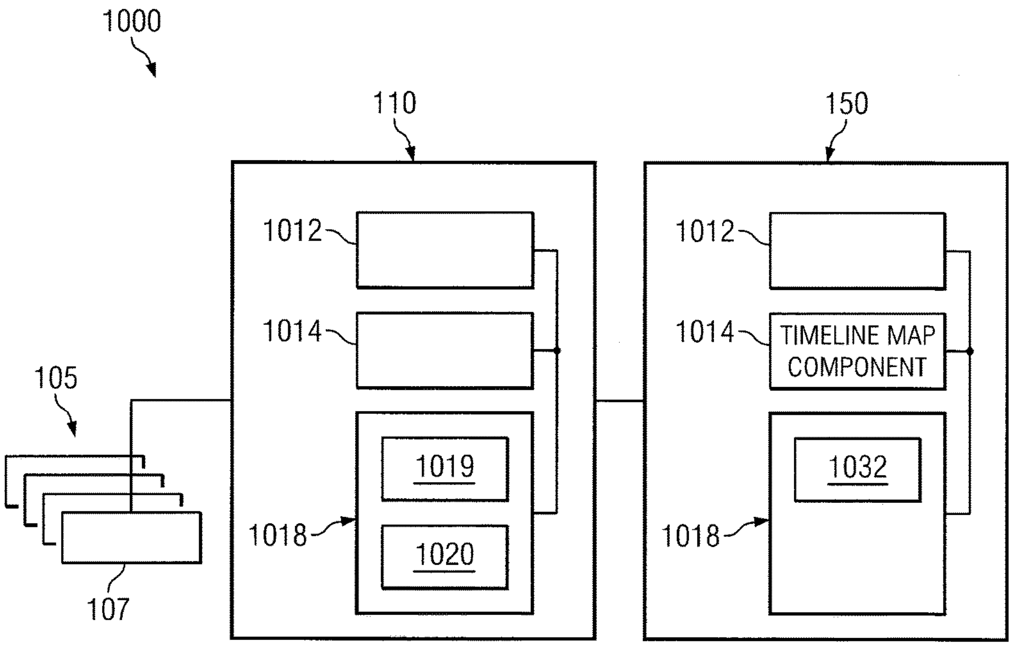
FIG. 12 represents a system for a timeline program according to an example embodiment.

FIG. 12 is a block diagram illustrating one embodiment of a computing environment 1000 with timeline system 110. Computing environment 1000 includes an object repository 105 storing objects 107. Object repository 105 can comprise a file server or database system or other storage mechanism remotely or locally accessible by timeline system 110.

In the embodiment of FIG. 12, object management system 110 comprises a server having a central processing unit 1012 connected to a memory 1014 and storage 1018 via a bus. Central processing unit 1012 may represent a single processor, multiple processors, a processor(s) with multiple processing cores and the like. Memory 1014 may be configured to store program code. Storage 1018 may include a non-transitory storage medium such as hard-disk drives, flash memory devices, optical media and the like. Object management system 110 may be connected to a data communications network.

Storage 1018 stores computer executable instructions 1019 and an application program interface 1020. Computer executable instructions 1019 can represent multiple programs and operating system code configured to communicate with the repository 105 and the computer client 150.

Client computer system 150 may include similar components as the server of object management system 110, such as a CPU, memory and storage. Additionally, as shown client computer system 150 may include executable instructions 1032 within a storage 1018 to provide a view of the timeline system on a display of the client computer system 150. Further, the client computer system 150 may contain a memory 1012 to locally store the timeline program component 155. Client computer system 150 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system).

Embodiments disclosed herein may be implemented in suitable software including computer-executable instructions. As one skilled in the art can appreciate, a computer program product implementing an embodiment disclosed herein may comprise one or more non-transitory computer readable storage media storing computer instructions translatable by one or more processors in a computing environment. Examples of computer readable media may include, but are not limited to, volatile and non-volatile computer memories and storage devices such as ROM, RAM, HD, direct access storage device arrays, magnetic tapes, floppy diskettes, optical storage devices, etc. In an illustrative embodiment, some or all of the software components may reside on a single computer or on any combination of separate computers.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed:

1. A system for managing web site content, the system comprising:

a processor;

a repository storing a set of web site content objects with associated metadata including web site content management metadata, the set of web site content objects comprising content objects corresponding to content utilized to present a web site, each of the set of web site content objects associated with a content management workflow, the content management workflow defining a sequence of content management events for web site content management, the content management events associated with the publication of content on the web site, and the web site content management metadata for each web site content object including content management workflow metadata comprising at least one of status information, classification information, possible action information, past action information, future action information, related project information, access information, and scheduling information for that corresponding web site content object for the content of the web site;

an application program interface; and a non-transitory computer readable medium storing instructions to:

determine a first region of interest presented in a graphical user interface, the first region of interest corresponding to a first time range including future time segments;

retrieve, through the application program interface, content management workflow metadata corresponding to a project or process for the set of web site content objects having content management workflow metadata indicating at least one content management event associated with the content on the web site will occur within the first time range, wherein the amount of content management workflow metadata retrieved for the set of web site content objects is based on a determined level of zoom in the first region of the graphical user interface;

create a first set of nodes representing the set of web site content objects having content management workflow metadata indicating that at least one content management event associated with the content on the web site will occur within the first time range, wherein the first set of nodes comprises:

a first node for a first content management event corresponding to the project or process associated with a first web site content object, the first node created based on the retrieved content management workflow metadata for the first web site content object; and a second node for a second content management event corresponding to the project or process associated with the first web site content object, the second node created based on the retrieved content management workflow metadata for the first web site content object, and the second content management event scheduled to occur in association with the first web site content object in the future time segments;

display the first set of nodes in the graphical user interface, including the first node and the second node and the associated retrieved content management metadata determined based on the level of zoom, on a timeline in the graphical user interface for the first region of interest based on a time characteristic of the content management workflow metadata associated with the at least one content management event indicating that at least one content management event associated with the content on the web site will occur within the first time range; and perform an action on the first web site content object from the set of web site content objects within the repository based on a user interaction with the second node of the first set of nodes within the first region of interest, wherein the action includes altering the second content management event scheduled to occur in association with the first web site content object in the future time segments.

2. The system of claim 1, wherein the non-transitory computer readable medium further storing instructions to:

determine a second region of interest on a graphical user interface corresponding to a second time range;

retrieve through the application program interface metadata for a second set of content objects having content management workflow metadata indicating at least one content management event will occur within the second time range;

create a second set of nodes representing the second set of content objects in the second region of interest;

display the determined second set of nodes on the timeline in the graphical user interface for the second time range based on a time characteristic of the content management workflow metadata associated with the at least one content management event; and perform an action on a corresponding web site content object from the second set of content objects within the repository based on a user interaction with a node within the second region of interest.

3. The system of claim 2, wherein the determined first set of nodes are displayed on a first timeline in the graphical user interface and the determined second set of nodes are displayed on a second timeline in the graphical user interface.

4. The system of claim 2, wherein the determining the second time range is based on a user panning the graphical user interface to the second time range.

5. The system of claim 1, the non-transitory computer readable medium further storing instructions to:

display a density view with a number representing an amount of the content management events occurring within each of the time segments.

6. The system of claim 1, the non-transitory computer readable medium further storing instructions to:

display a plurality of filter options in the graphical user interface;

determine that a user has selected at least one of the filter options in the graphical user interface;

filter the determined first set of nodes based on the selected at least one filtering option; and display the filtered first set of nodes in the graphical user interface.

7. The system of claim 1, the non-transitory computer readable medium further storing instructions to:

determine that a user has selected a node in the graphical user interface from the displayed first set of nodes;

retrieve additional metadata associated with the selected node through the application program interface; and display the additional metadata for the selected node in the graphical user interface.

8. A method for managing web site content objects within a web site content object management system, the method comprising:

storing a set of web site content objects in a repository with associated metadata including web site content management workflow metadata, the set of web site content objects comprising content objects corresponding to content utilized to present a web site, each of the set of web site content objects associated with a content management workflow, the content management workflow defining a sequence of content management events for web site management, the content management events associated with the publication of content on the web site, and the web site content management metadata for each web site content object including content management workflow metadata comprising at least one of status information, classification information, possible action information, past action information, future action information, related project information, access information, and scheduling information for that corresponding web site content object for the content of the web site;

determining a first region of interest presented in a graphical user interface, the first region of interest corresponding to a first time range including future time segments;

retrieving, through an application program interface, content management workflow metadata corresponding to a project or process for the set of web site content objects having content management workflow metadata indicating at least one content management event associated with the content on the web site will occur within the first time range, wherein the amount of content management workflow metadata retrieved for the set of web site content objects is based on a determined level of zoom in the first region of the graphical user interface;

creating a first set of nodes representing the set of web site content objects having content management workflow metadata indicating that at least one content management event associated with the content on the web site will occur within the first time range, wherein the first set of nodes comprises:

a first node for a first content management event corresponding to the project or process associated with a first web site content object, the first node created based on the retrieved content management workflow metadata for the first web site content object; and a second node for a second content management event corresponding to the project or process associated with the first web site content object, the second node created based on the retrieved content management workflow metadata for the first web site content object, and the second content management event scheduled to occur in association with the first web site content object in the future time segments;

displaying the first set of nodes in the graphical user interface, including the first node and the second node, and the associated retrieved content management metadata determined based on the level of zoom, on a timeline in the graphical user interface for the first region of interest based on a time characteristic of the content management workflow metadata associated with the at least one content management event indicating that at least one content management event associated with the content on the web site will occur within the first time range; and performing an action on the first web site content object from the set of web site content objects within the repository based on a user interaction with the second node of the first set of nodes within the first region of interest, wherein the action includes altering the second content management event scheduled to occur in association with the first web site content object in the future time segments.

9. The method of claim 8, further comprising:

determining a second region of interest on a graphical user interface corresponding to a second time range;

retrieving through the application program interface metadata for a second set of web site content objects having content management workflow metadata indicating at least one content management event will occur within the second time range;

creating a second set of nodes representing the second set of web site content objects in the second region of interest;

displaying the determined second set of nodes on the timeline in the graphical user interface for the second time range based on a time characteristic of the content management workflow metadata associated with the at least one content management event; and performing an action on a corresponding web site content object from the second set of web site content objects within the repository based on a user interaction with a node within the second region of interest.

10. The method of claim 9, wherein the determined first set of nodes are displayed on a first timeline in the graphical user interface and the determined second set of nodes are displayed on a second timeline in the graphical user interface.

11. The method of claim 9, wherein the determining the second time range is based on a user panning the graphical user interface to the second time range.

12. The method of claim 8, wherein the displaying further includes:

displaying a density view with a number representing an amount of the content management events occurring within each of the time segments.

13. The method of claim 8, further comprising:

displaying a plurality of filter options in the graphical user interface;

determining that a user has selected at least one of the filter options in the graphical user interface;

filtering the determined first set of nodes based on the selected at least one filtering option; and displaying the filtered first set of nodes in the graphical user interface.

14. The method of claim 8, further comprising:

determining that a user has selected a node in the graphical user interface from the displayed first set of nodes;

retrieving additional metadata associated with the selected node through the application program interface; and displaying the additional metadata for the selected node in the graphical user interface.

15. A non-transitory computer program product comprising at least one computer-readable storage medium having computer-readable program code portions stored therein, the computer readable program code portions comprising:

a first executable portion configured to store a set of web site content objects in a repository with associated metadata including web site content management workflow metadata, the set of web site content objects comprising content objects corresponding to content utilized to present a web site, each of the set of web site content objects associated with a content management workflow, the content management workflow defining a sequence of content management events for web site management, the content management events associated with the publication of content on the web site, and the web site content management metadata for each web site content object including content management workflow metadata comprising at least one of status information, classification information, possible action information, past action information, future action information, related project information, access information, and scheduling information for that corresponding web site content object for the content of the web site;

a second executable portion configured to determine a first region of interest presented in a graphical user interface, the first region of interest corresponding to a first time range including future time segments;

a third executable portion configured to retrieve, through the application program interface, content management workflow metadata corresponding to a project or process for the set of web site content objects having content management workflow metadata indicating at least one content management event associated with the content on the web site will occur within the first time range, wherein the amount of content management workflow metadata retrieved for the set of web site content objects is based on a determined level of zoom in the first region of the graphical user interface; and create a first set of nodes representing the set of web site content objects having content management workflow metadata indicating that at least one content management event associated with the content on the web site will occur within the first time range, wherein the first set of nodes comprises:

a first node for a first content management event corresponding to the project or process associated with a first web site content object, the first node created based on the retrieved content management workflow metadata for the first web site content object; and a second node for a second content management event corresponding to the project or process associated with the first web site content object, the second node created based on the retrieved content management workflow metadata for the first web site content object, and the second content management event scheduled to occur in association with the first web site content object in the future time segments;

a fourth executable portion configured to display the first set of nodes in the graphical user interface, including the first node and the second node, and the associated retrieved content management metadata determined based on the level of zoom, on a timeline in the graphical user interface for the first region of interest based on a time characteristic of the content management workflow metadata associated with the at least one content management event indicating that at least one content management event associated with the content on the web site will occur within the first time range; and a fifth executable portion configured to perform an action on the first web site content object from the set of web site content objects within the repository based on a user interaction with the second node of the first set of nodes within the first region of interest, wherein the action includes altering the second content management event scheduled to occur in association with the first web site content object in the future time segments.

16. The non-transitory computer program product of claim 15, wherein the second executable portion is configured to determine a second region of interest on a graphical user interface corresponding to a second time range;

the third executable portion is configured to retrieve through the application program interface content management metadata for a second set of web site content objects having content management workflow metadata indicating at least one content management event will occur within the second time range, and create a second set of nodes representing the second set of web site content objects in the second region of interest;

the fourth executable portion is configured to display the determined second set of nodes on the timeline in the graphical user interface for the second time range based on a time characteristic of the content management workflow metadata associated with the at least one content management event; and the fifth executable portion is configured to perform an action on a corresponding web site content object from the second set of web site content objects within the repository based on a user interaction with a node within the second region of interest.

17. The non-transitory computer program product of claim 16, wherein the determined first set of nodes are displayed on a first timeline in the graphical user interface and the determined second set of nodes are displayed on a second timeline in the graphical user interface.

18. The non-transitory computer program product of claim 16, wherein the determining the second time range is based on a user panning the graphical user interface to the second time range.

19. The non-transitory computer program product of claim 15, wherein the fourth executable portion is further configured to display a density view with a number representing an amount of the content management events occurring within each of the time segments.

20. The non-transitory computer program product of claim 15, wherein the fourth executable portion is configured to display a plurality of filter options in the graphical user interface;

the second executable portion is configured to determine that a user has selected at least one of the filter options in the graphical user interface; and a sixth executable portion is configured to filter the determined first set nodes based on the selected at least one filtering option, and display the filtered first set of nodes in the graphical user interface.

21. The system of claim 1, wherein the content management workflow metadata for a first content object in the set of web site content objects is specified by metadata for a second object.

22. The method of claim 8, wherein the content management workflow metadata for a first content object in the set of web site content objects is specified by metadata for a second object.

23. The non-transitory computer program product of claim 15, wherein the content management workflow metadata for a first content object in the set of web site content objects is specified by metadata for a second object.

* * * * *